United States Patent [19]

Stegherr et al.

[11] 4,043,146
[45] Aug. 23, 1977

[54] SHAFT COUPLING

[75] Inventors: Rudolf Stegherr, Guending; Gerhard Ruecker, Karlsfeld, both of Germany

[73] Assignee: Motoren- und Turbinen-Union Muenchen GmbH M.A.N. Maybach Mercedes-Benz, Munich, Germany

[21] Appl. No.: 598,043

[22] Filed: July 22, 1975

[30] Foreign Application Priority Data

July 27, 1974 Germany .............................. 2436270

[51] Int. Cl.² .............................................. F16D 3/24
[52] U.S. Cl. ........................................... 64/1 V; 64/6; 64/9 R; 403/216; 403/315; 403/377
[58] Field of Search ...................... 64/6, 9, 1 V, 1 S, 4, 64/23; 403/216, 315, 377

[56] References Cited

U.S. PATENT DOCUMENTS

| 2,732,695 | 1/1956 | Davis | 64/9 R |
| 2,888,283 | 5/1959 | Dicken | 64/1 S |
| 3,020,775 | 2/1962 | Musser | 64/1 V |
| 3,406,535 | 10/1968 | Suderow | 64/9 R |
| 3,686,895 | 8/1972 | Easley | 64/1 V |

Primary Examiner—Samuel Scott
Assistant Examiner—Randall Heald
Attorney, Agent, or Firm—W. G. Fasse; W. W. Roberts

[57] ABSTRACT

The present shaft coupling is intended for releasably linking two or more devices to each other in a torque transmitting manner. The devices may, for example, be turbines each of which has a shaft. Two bearing mounts are provided for one of the shafts, but only one bearing mount is provided for the other shaft at its end remote from the coupling. The coupling between the two shafts is formed by inserting a non-circular end portion of one shaft in a corresponding non-circular aperture in the end of the other shaft. An axially extending bolt firmly clamps the two shafts together in the axial direction. One or both of the shafts may be hollow. The non-circular profiles of the shafts may be splined, or have a polygonal profile, and the polygonal profile may be tapered. A polygonal profile as used herein may be one with only three sides.

7 Claims, 10 Drawing Figures

SHAFT COUPLING

BACKGROUND OF THE INVENTION

This invention relates to torque transmitting shaft interconnections, and is particularly directed to means for interconnecting the shaft of a pair of rigidly interconnected assemblies. While the invention is of special use in small gas turbine equipment, it will, of course, be apparent that it may be advantageously employed in other applications, for example, connecting a motor to a generator.

In turbine technology and especially in the technology of small gas turbines, it is conventional to employ the module type of construction. In this type of construction, if a defect occurs in one of the modules or assemblies, it is merely necessary to remove and replace the defective module with a corresponding module without the necessity for disassemblying the entire power plant.

In the module type of construction of an apparatus, difficulties are encountered, for example, at the point of interconnection of the shafts of two adjacent assemblies. The shafts must, of course, be interconnected to assure torque transmission in operation, but must be designed in such a manner that they can be disconnected. In addition, the shafts must be as rigid as possible so that rotation at high rpm is permitted while still maintaining a subcritical rpm.

In known gas turbines, especially small shaft horsepower turbines, an adaptor is provided at the point of coupling two shafts, for example, between a gear box and a turbine. The adaptor may be in the form of an internally splined tubular component permitting lateral misalignment of the two shafts. In this arrangement, the gear box shaft and the turbine shaft must each be supported by two bearings in their respective assemblies, and splined externally at the ends to be joined. This arrangement thus requires an undesirably large number of bearings. Further, such arrangements require an undesirable increase in weight and space required for the interconnection of the shaft, with a further disadvantage of slippage at the antifriction bearings.

OBJECTS OF THE INVENTION

In view of the above, it is the aim of the invention to achieve the following objects singly or in combination:

to provide a shaft interconnection between the shafts of two rigidly interconnected assemblies, which overcomes the disadvantages of known interconnections as above discussed;

to provide a simple shaft assembly for interconnecting two shafts for torque transmittion in a pair of rigidly interconnected assemblies, wherein the number of bearings for the shaft assembly is minimized, and the weight and space required for the shaft interconnection is also minimized; and to provide a stiff and slender shaft interconnection for transmitting torque between the shafts of a pair of rigidly interconnected assemblies, whereby the shafts may be readily disconnected.

SUMMARY OF THE INVENTION

According to the invention, the above objects are achieved in a shaft coupling by means of which two shaft ends of two different structural units or assemblies are rigidly connected to one another in a positive torque transmitting manner. One of the shafts is supported by two bearings, while the other shaft is supported by a bearing only at the end thereof away from the interconnection of the shafts. As a consequence, one bearing is eliminated in comparison with known arrangements. Due to the rigid interconnection of the shafts, critical speeds for the shafts may be determined on the basis of a one piece shaft. Further, since a rigid connection is provided between the shafts, the weight and space of the connection is minimized, and it is not necessary to employ a large coupling sleeve. Thus, the balance problems encountered in the use of a large coupling sleeve are obviated. Furthermore, undesirable slippage of the bearing has also been avoided. Such slippage does not occurr due to radial loads resulting heretofore from radial misalignment of the shafts.

In a preferred embodiment of the invention, the two shafts are interlocked together for the transmission of torque in a positive manner. The shafts are rigidly but releasably interconnected and the coupling is secured by threaded means providing a small diameter construction which is nevertheless rigid and simple to assemble and disassemble.

The threaded means may comprise a threaded bolt axially clamping the two shafts together in a disconnectable manner. Preferably one shaft end is constructed as a hollow hub or sleeve while the other shaft end is shaped as a plug-in member fitting into the hollow sleeve.

At least one of the shafts may be hollow, preferably the one with the hollow sleeve, whereby the threaded bolt is located inside the hollow shaft. The threaded bolt rests against a shoulder in the hollow shaft and engages the plug-in shaft whereby the latter is tightly pulled against the hollow shaft when the bolt is screwed into threads in an axial aperture in the end of the plug-in shaft.

The combination of a hollow sleeve shaft end and a plug-in shaft end is rather very simple and the form locking pair of coupling elements may be realized in a plurality of ways. Similarly, the axially precise clamping may be accomplished in several ways. Especially, the combination of the hollow shaft with the hollow sleeve is a very efficient way of accommodating an axially aligned clamping screw bolt.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
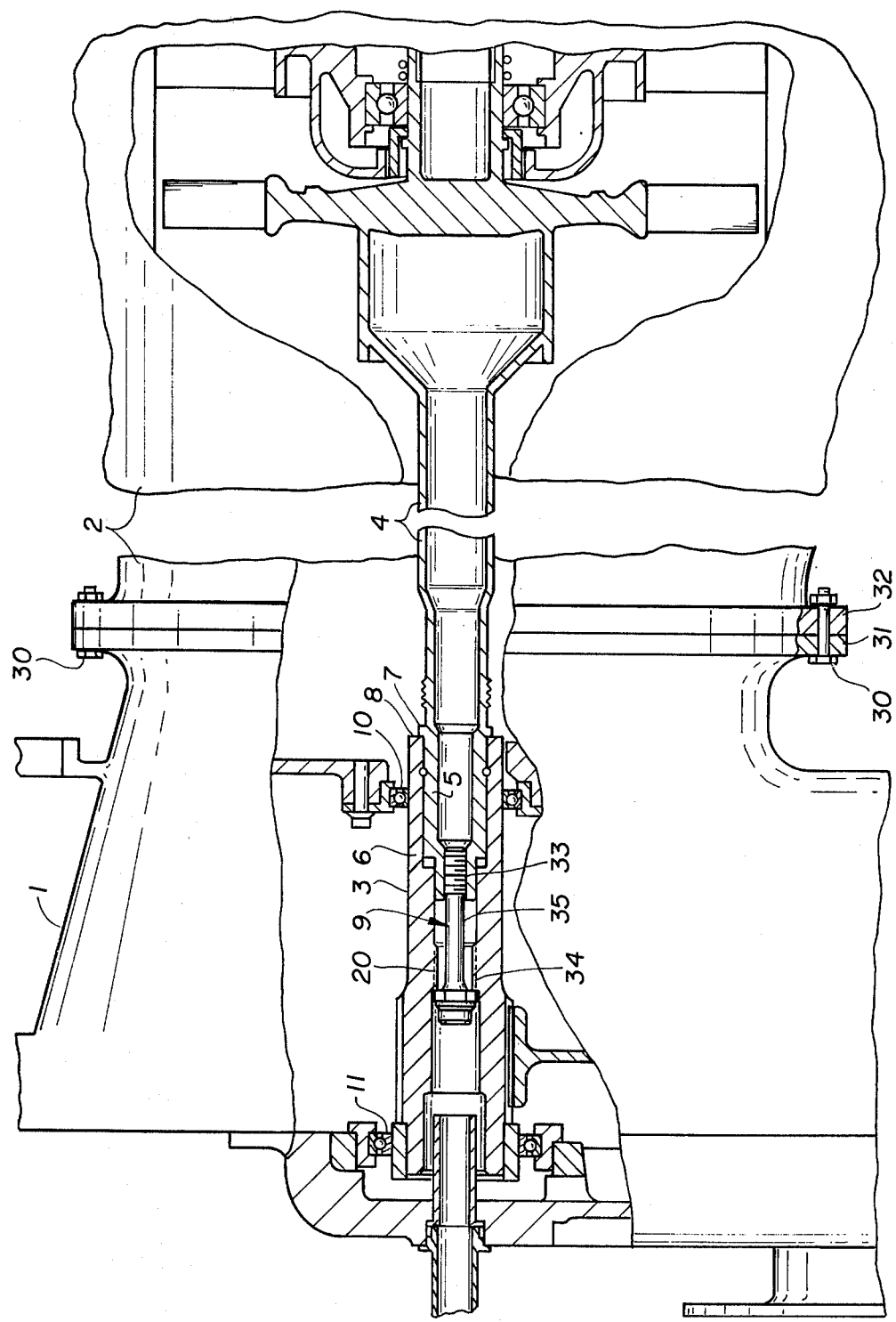
FIG. 1 is a partially broken away, partially cross sectional view of a gear box coupled to a gas turbine in accordance with the invention whereby the shafts are supported by three bearings as taught herein.
Figure 2:
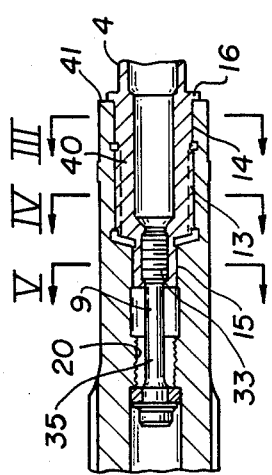
FIG. 2 shows an axial, sectional view of a coupling with a splined plug-in shaft end and a correspondingly grooved hollow shaft end, with two centering means and a flange.

FIG. 1 illustrates a gear box 1 and a gas turbine 2 of general conventional construction, with the exception of the shaft coupling and bearing support arrangement. The housing of the gear box 1 and the housing of the gas turbine 2 are rigidly interconnected, for example, be means of bolts 30 extending through the respective flanges 31 and 32. The gear box 1 has a shaft 3, and the turbine 2 has a shaft 4. These shafts are coupled for the transmission of torque. According to the invention, shaft 4 has a plug-in end or member 5 and shaft 3 has a hollow female end sleeve 6.

The end 5 of the shaft 4 is inserted in the hollow end 6 of the hollow shaft 3 whereby an outwardly extending shoulder 7 on the shaft 4 engages an end face 8 of the hollow shaft 3.

The end 5 of the shaft 4 has an axially extending threaded aperture 33. The hollow shaft 3 has an inwardly extending shoulder 34 spaced from the face 8 thereof and a threaded bolt 9 is threaded into the aperture 33 with its head engaging the shoulder 34. The bolt 9 thus enables the shaft 4 to be drawn axially so that the shoulder 7 of shaft 4 firmly engages the end face 8 of the hollow shaft 3 to rigidly couple the two shafts. The bolt 9 may be removed from the other end of the hollow shaft 3 to disconnect the two shafts. The bolt 9 has preferably a necked-down or reduced diameter length 35 thus constituting a locking screw bolt with an improved distribution of the clamping force between the two shafts and to prevent any slack in the axial coupling force.

A portion of the internal surface of the hollow shaft 3 may have an internal thread 20 spaced sufficiently from the forward end of the plug-in member 5 to enable the power separation of the two shafts by means of a threaded tool. Thus, upon removal of the bolt 9, a jacking tool may be inserted in the hollow shaft 3 engaging the thread 20 and extending to the end of the shaft 5 to separate the two shafts.

The hollow shaft 3 is supported by a bearing 10 mounted within the gear box 1 at the coupling of the two shafts. A further bearing 11 is mounted in the gear box 1 and axially spaced from the bearing 10 to support the other end of shaft 3. The shaft 4 is supported by a single bearing 12 in the gas turbine 2, at the end away from the coupling between the two shafts 3, 4. However, in accordance with the invention, due to the plug-in coupling, the shaft 4 is also supported by the bearing 10 so that advantageously only three bearings are required. Alternatively, two bearings may be provided for the shaft 4 and only a single bearing away from the coupling for the shaft 3.

Minor misalignment of the shafts in the axial direction may occur where only a total of three bearings is used. However, such misalignment will cause only an insignificant radial load, particularly on the bearing 10. In any event, such radial load must not exceed a given value. If necessary, the radial load may be controlled by positioning the bearing 10 intentionally somewhat off the center line joining the axes of the bearings 11 and 12. The resulting radial load will prevent slippage of the bearing 10, in the absence of any load from a gear. The bearings 10, 11 and 12 may be conventional anti-friction bearings, such as roller or ball bearings. As illustrated, the shaft 4 may also be hollow.

Besides the above mentioned misalignment of the shafts 3 and 4 relative to the bearings aside, the shafts 3 and 4 must be axially aligned relative to each other and there must be a stop for axially fixing the shafts with respect to each other while simultaneously assuring the required form locking, torque transmitting coupling. For this purpose, in accordance with one embodiment of the invention, as illustrated in FIGS. 2 to 5, a portion 40 of the plug-in end of the shaft 4 is provided with outwardly extending splines 13, which fit into corresponding axially extending grooves in the adjacent inner wall of the shaft 3. Further, the shaft 4 has coaxial circular collars or surfaces 14, 15 on opposite sides of the splined portion 40, which radially engage corresponding circular inside surfaces of the hollow shaft 3 to center the two shafts. A shoulder 16 on the shaft 4 engages the end face 41 of the shaft 3 to assure the axial coupling of the two shafts under tension by means of the threaded bolt 9.

Figure 6:
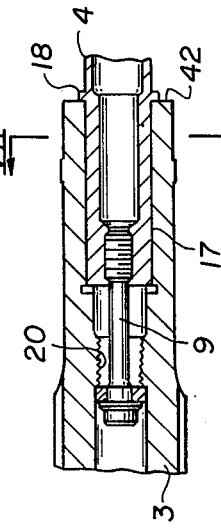
FIG. 6 illustrates a sectional view of a modified embodiment of a plug-in coupling of the invention including so called polygonal coupling or matching surfaces.
Figure 7:
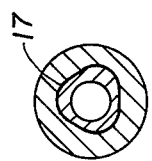
FIG. 7 is a sectional view of the coupling of FIG. 6, taken along the line VII—VII.

Modified embodiments of the invention may use non-circular sectional configurations for the matching elements of the coupling to transmit torque between the two shafts. Thus, as illustrated in FIGS. 6 and 7, the cross section of the end 17 of the shaft 4 has three or more distinct sides with rounded corners. The aperture of the shaft 3 has a corresponding cross section to transmit torque and to simultaneously center the two shafts. Thus, separate circular centering collars are not required in this embodiment. The shoulder 18 on the shaft 4 engages the end face 42 of the shaft 3 and assures the axial abuttment of the two shafts. The end 17 of the shaft 4 may have additional sides or corners. In any event, a section with three or more sides is considered a polygonal section and has the mathematic form of a epicyclic curve.

Figure 8:
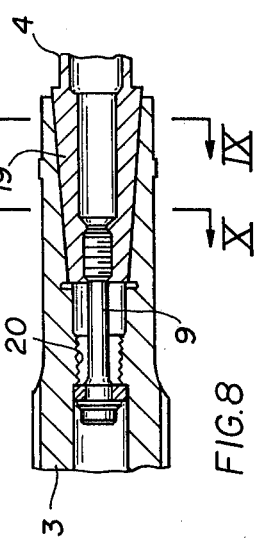
FIG. 8 shows a sectional view through a still further modification of the invention including conical, polygonal plug-in members.
Figure 3:
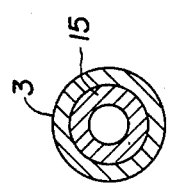
FIG. 3 is a sectional view of the coupling of FIG. 2, taken along the line III—III.
Figure 9:
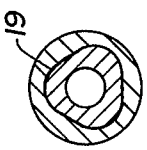
FIG. 9 is a sectional view of the coupling of FIG. 8, taken along the line IX—IX.
Figure 4:
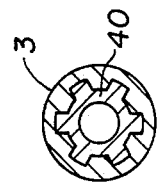
FIG. 4 is a sectional view of the coupling of FIG. 2, taken along the line IV—IV.
Figure 10:
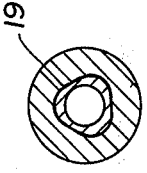
FIG. 10 is a sectional view of the coupling of FIG. 8, taken along the line X—X.
Figure 5:
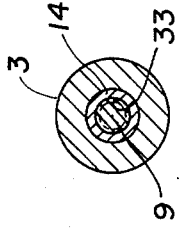
FIG. 5 is a sectional view of the coupling of FIG. 2, taken along the line V—V.

A further embodiment of the invention is illustrated in FIGS. 8 to 10. The plug-in end of the shaft 4 in FIG. 8 has a polygonal section 19 similar to that illustrated in FIGS. 6 and 7, but in this case the section 19 of the shaft is tapered. This embodiment has the advantage that the three functions of transferring torque, centering and axial location are accomplished simultaneously by the matching tapered elements. Hence, it is not necessary to provide a flange such as 16 or 18 for the axial positioning of the shafts nor it it necessary to provide radially centering surfaces such as 14 and 15.

Although the invention has been described with reference to specific example embodiments, it is to be understood, that it is intended to cover all modifications and equivalents within the scope of the appended claims.

What is claimed is:

1. In an apparatus having first and second rigidly interconnected assemblies, each of which includes a respective rotatable shaft, and bearing means supporting said shafts, the improvement comprising force transmitting coupling means operatively arranged for rigidly but releasably interconnecting adjacent ends of said shafts to transmit torque therebetween, said bearing means comprising two bearings supporting one of said shafts at two axially spaced apart positions, said bearing means including a further bearing mounted to support the other of said shafts only at the end thereof away from said coupling means, wherein one of said shafts is hollow with a non-circular inner surface portion toward one end of the hollow shaft, and the other of said shafts has a correspondingly non-circular outer surface portion adapted for engaging the non-circular inner surface portion of said hollow shaft to positively interlock said shafts for rotation and torque transmission when the shafts are coupled, said hollow shaft further having an inner thrust threading (20) toward the other end of the hollow shaft for separating the coupling means.

2. The apparatus of claim 1, wherein one of said shafts has an axially extending bore in said coupling, said bore having a non-circular bore portion, wherein the other shaft has a correspondingly non-circular plug-in portion engaging the non-circular bore portion to form an interlocking plug-in connection, and further comprising threaded means interconnecting said shafts at said coupling means to secure said plug-in connection.

3. The apparatus of claim 1, wherein said hollow shaft has an internal shoulder, said coupling means further comprising a centrally arranged threaded bolt with a head engaging said shoulder, said threaded bolt forming part of said coupling means for axially clamping said shafts together.

4. The apparatus of claim 3, further comprising axially extending grooves in said non-circular inner surface of said hollow shaft, said corresondingly non-circular portion of said other shaft having splines for engaging said grooves, said other shaft further having coaxial circular portions on each side of said non-circular portion, said hollow shaft having respective circular inner portions engaging said circular portions of said other shaft for radially centering said shafts, said other shaft further having a shoulder axially engaging the end face of said hollow shaft.

5. The apparatus of claim 3, wherein said non-circular portions of said hollow shaft and said other shaft have matching sectional profiles, said other shaft having a shoulder engaging the end face of said hollow shaft.

6. The apparatus of claim 3, wherein said non-circular surfaces are tapered and have matching sectional profiles.

7. The apparatus of claim 3, wherein said threaded bolt is provided with a reduced diameter portion to constitute a so called necked-down bolt.

* * * * *